Aug. 18, 1959    C. E. BOUCHER    2,900,514
DAYLIGHT FILM LOADING AND DEVELOPING APPARATUS
Filed May 18, 1955    4 Sheets-Sheet 2

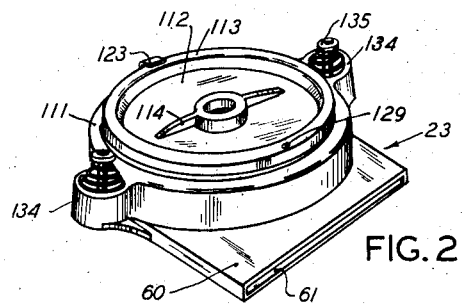
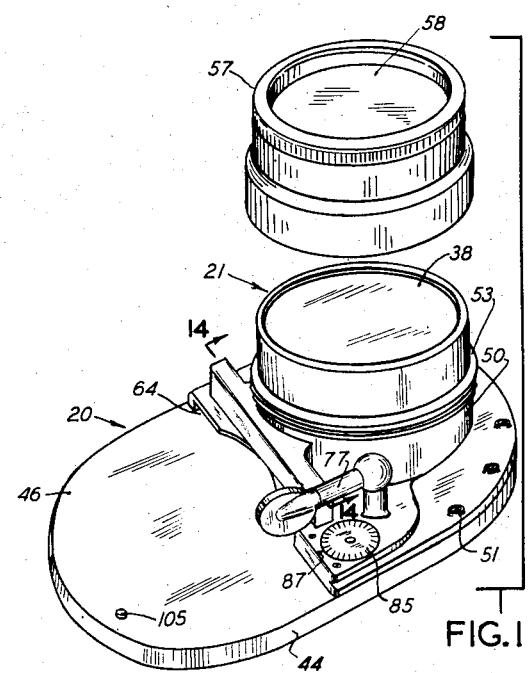
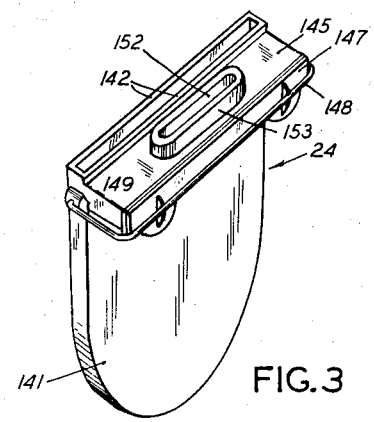
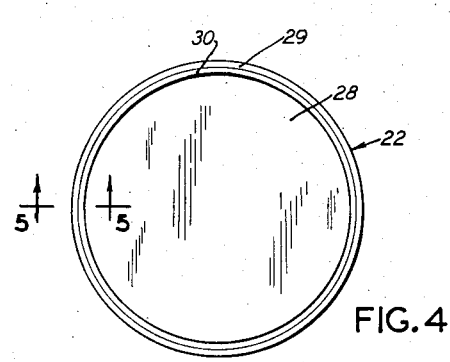
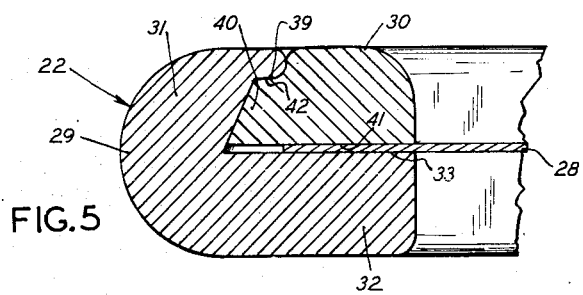
INVENTOR.
CORMACK E. BOUCHER

INVENTOR.
CORMACK E. BOUCHER
BY
Buckhorn and Cheatham
ATTORNEYS

Aug. 18, 1959     C. E. BOUCHER     2,900,514
DAYLIGHT FILM LOADING AND DEVELOPING APPARATUS
Filed May 18, 1955     4 Sheets-Sheet 3
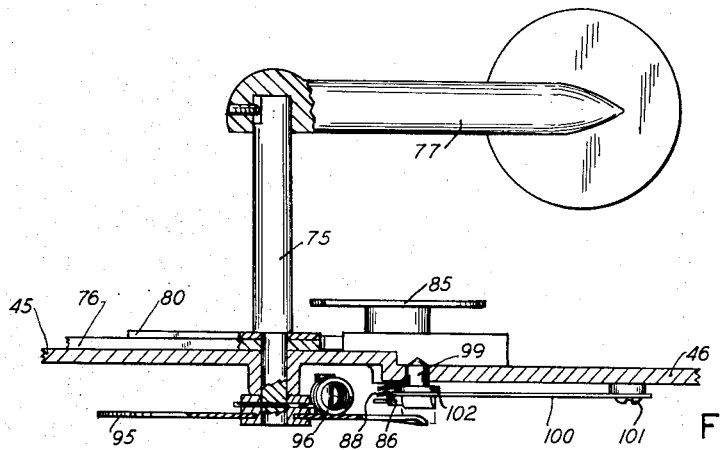
FIG. 10
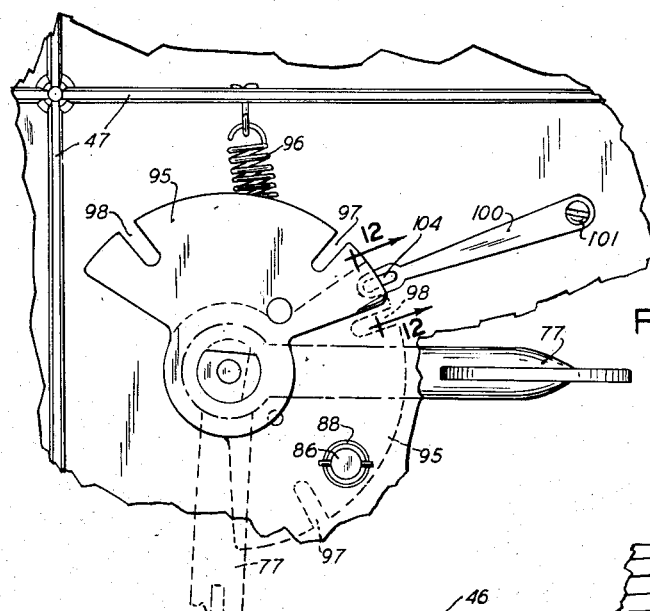
FIG. 11
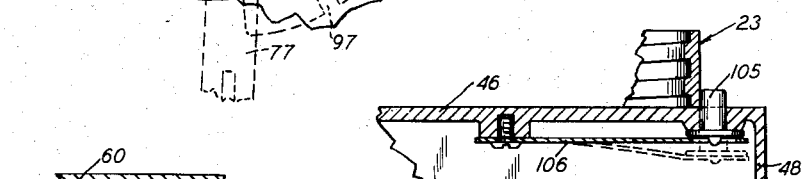
FIG. 12
FIG. 13
INVENTOR.
CORMACK E. BOUCHER
BY
Buckhorn and Cheatham
ATTORNEYS Aug. 18, 1959 C. E. BOUCHER 2,900,514
DAYLIGHT FILM LOADING AND DEVELOPING APPARATUS
Filed May 18, 1955 4 Sheets-Sheet 4

INVENTOR.
CORMACK E BOUCHER
BY
Buckhorn and Cheatham
ATTORNEYS

United States Patent Office 2,900,514
Patented Aug. 18, 1959

2,900,514

DAYLIGHT FILM LOADING AND DEVELOPING APPARATUS

Cormack E. Boucher, Seattle, Wash.

Application May 18, 1955, Serial No. 509,366

20 Claims. (Cl. 250—65)

The present invention relates to apparatus for handling sensitized photographic film, and more particularly to portable film handling apparatus for use in X-ray examinations.

In making X-ray examinations of welds and other critical areas of large structures such as fluid storage tanks and chemical processing equipment, it has been the practice heretofore to load exposure cassettes with sensitized film in a darkroom, the operator thereafter carrying the supply of cassettes to the work site and making a series of examination exposures. The cassettes were then returned to a darkroom and the exposed film removed from the cassettes and developed. The investment for an adequate darkroom is substantial, and frequently darkroom facilities are not readily available to the location of the structure under examination. Moreover, the procedure is unwieldy for if, upon developing of the film, it appears that one of the exposures is inadequate, the operator must relocate the area covered by the previous exposure and may have to re-position staging or scaffolding and the X-ray equipment which has in the meantime been moved to a new position on the structure. This procedure has been necessary because there has not been available heretofore suitable portable equipment enabling the handling of sensitized film at the work site. Accordingly, it is an object of the invention to provide light weight, portable apparatus which will permit the loading of exposure cassettes and subsequent developing of the exposed film directly at the work site and without resort to a darkroom.

More particularly, it is an object to provide portable apparatus for loading a sensitized film into an X-ray cassette in daylight without exposing the film to actinic light.

Another important object of the invention is to provide a cooperating arrangement of a cassette and a portable developing tank whereby a sensitized film may be transferred from the cassette to the tank in daylight and without exposure of the film to actinic light.

Still another important object is to provide a new and improved compact, portable developing unit to which developing liquids may easily be added or removed.

Another object is to provide a new and novel holder or frame for sensitized film which facilitates the handling of the film in the apparatus of the invention.

A further object is to provide a new and improved canister for shipping, storing and dispensing a supply of the framed, sensitized film elements of the invention.

Other objects and advantages of the invention will be made more apparent hereinafter.

In accordance with the illustrated embodiment, an exposure cassette is provided having a snoutlike projection defininig a slot through which a film element may be loaded or removed from the cassette. To load the cassette, a film dispenser is provided having means for retaining a supply of film elements and means for dispensing the film elements one at a time from the supply. The dispenser is provided with a mouthlike enclosure for encompassing the snout of the cassette and retaining it in light tight engagement with the opening in the dispenser through which the film elements are dispensed whereby the transfer to the cassette may be effected without exposure of the film element to actinic light. A film developing unit is provided likewise having a mouthlike enclosure for removably receiving the snout of the cassette to provide a light tight passage way for the transfer of a film element from the cassette to the unit. Each of the above units is compact and of light weight and adapted to be used at the site of X-ray examinations. The foregoing and additional details of the invention are shown in the accompanying drawings wherein:

Fig. 1 is a partly exploded perspective view of the dispensing unit;

Fig. 2 is a perspective view of the cassette;

Fig. 3 is a perspective view of the film developing unit;

Fig. 4 is a plan view of the film element of the invention;

Fig. 5 is an enlarged, fragmentary sectional view of the film element along line 5—5 of Fig. 4;

Fig. 6 is a side elevation of the canister of the invention, broken away to show details thereof;

Fig. 10 is an enlarged sectional view taken substantially along line 10—10 of Fig. 8, showing further details of the film ejecting mechanism;

Fig. 11 is an enlarged bottom view of the mechanism shown in Fig. 10;

Fig. 12 is a fragmentary sectional view taken generally along line 12—12 of Fig. 11 showing a detail of the film ejecting mechanism;

Fig. 13 is a sectional view taken along line 13—13 of Fig. 8 showing the catch mechanism for holding the cassette upon the dispenser;

*General description*

Figure 7:
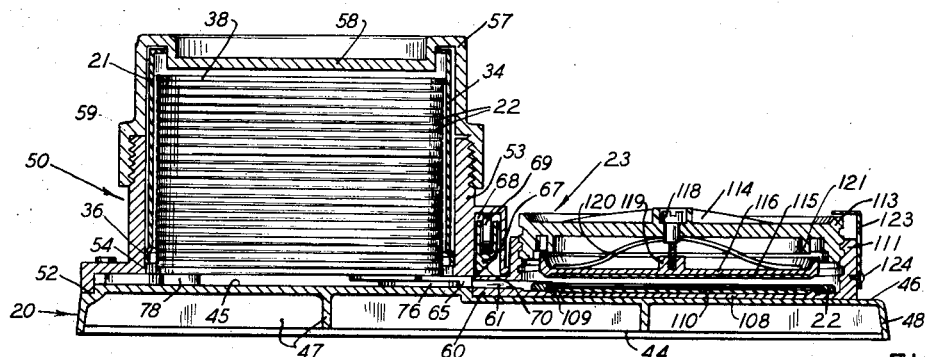
Fig. 7 is a longitudinal section through the dispenser and the cassette mounted in loading position on the dispenser, and showing the arrangement of the dispenser and cassette after the cassette has been loaded but prior to conditioning of the latter for removal from the dispenser.

In the particular embodiment of the invention illustrated in the drawings, the film loading apparatus or dispenser is indicated generally by the numeral 20, a general view of the same being shown in Fig. 1. The film dispenser 20 is capable of receiving a canister 21 containing a supply of sensitized film elements 22 such as shown in Figs. 4 and 5, and is adapted to load the film elements one at a time into an exposure device such as the cassette 23 shown in Fig. 2 in which the film element is retained during X-ray exposure. After exposure, the film element 22 may be transferred from the cassette 23 to a developing apparatus 24 such as that shown in Fig. 3 into which various developing solutions may be poured to develop the exposed film.

Film element

Referring now particularly to Figs. 4 and 5, the film element 22 as illustrated consists of a unit comprising a sensitized photographic film, in this instance a circular disc 28 mounted within a frame comprising a molded plastic base ring 29 and a molded plastic lock ring 30 adapted to lend support to the film and facilitate its transfer between the various pieces of the apparatus of the invention. As best shown in Fig. 5, the base ring 29 comprises a body portion 31 of substantially greater thickness than the film 28, and a circular flange portion 32 extending inwardly of the body portion and defining a flat surface 33 substantially coplanar with the transverse plane bisecting said body portion. The body portion is recessed adjacent the flange portion 32, the recess being defined by a wall portion coplanar with and an extension of the flange surface 33 and an opposed parallel wall portion 39 spaced from the surface 33 by a distance substantially greater than the thickness of the film 28. As evident in Fig. 5, the marginal edge portion of the film 28 overlaps the flange surface 33 and preferably extends into the recess of the body portion. The lock ring 30 includes a nose portion 40 which engages within the recess of the body portion 31 and is formed with a flat side 41 which engages the marginal edge portion of the film 28 and an opposed side 42 parallel to and engaging the recess wall 39. The sides 41, 42 are spaced apart a distance substantially equal to the distance between opposed recess walls 39, 33 less the thickness of the film 28 whereby the film is held snugly between the rings. It is important that the recess wall 39 and opposed lock ring side 42 be flat and parallel to the surface of the film 28 so as to prevent any tendency of the lock ring to cam out of place if the frame is twisted.

The film disc 28 is stamped from a sheet of sensitized film and is mounted in the frame by first disassembling the frame and placing the film against the flange surface 33. The lock ring 30 is then snapped into place to complete the mounting.

It will be observed that the frame will support the film 28 from any flat surface upon which the unit may be placed so that the film will not be scratched if the unit is slid over the surface.

Canister

The canister 21 forms a shipping and storage container for the film units 22 and, as best seen in Fig. 6, comprises a hollow, open ended housing or body 34 of slightly larger internal diameter than the rings 29 and having one end formed with an inwardly turned, circumferentially extending lip or flange 35 and the other end formed with an outwardly stepped rim 36. The canister 21 is adapted to be mounted in the loading device 20, as will be more particularly described, and when so mounted the canister is positioned with the rim portion 36 downwardly as shown in Fig. 6. An opaque bottom cover 37 is disposed within the rim 36 and is of such diameter so as to snugly engage the rim walls whereby the frictional engagement of the cover with the rim will prevent its accidental displacement. The canister body 34 is conveniently formed of thin aluminum or other malleable metal, and in which case the edges of the rim may be slightly crimped over the bottom cover 37 at two or three places additionally to secure the cover in place. A top opaque closure disc or cover 38 is slidably arranged within the body 34, the cover having a diameter such that it snugly engages the side walls of the body 34.

The film units 22 are stacked between the covers 37, 38 as shown in Fig. 6, and the canister body is preferably of such length that when the canister is fully loaded the covers engage the opposite ends of the stack, the reason for which will be explained hereinafter. By reason of the overlapping arrangement of the lip 35 and rim 36 with the corresponding covers, it will be observed that a light tight seal is provided at the opposite ends of the canister preventing transmission of light into the same, thus protecting the film therewithin from accidental exposure.

Film dispenser

Figure 8:
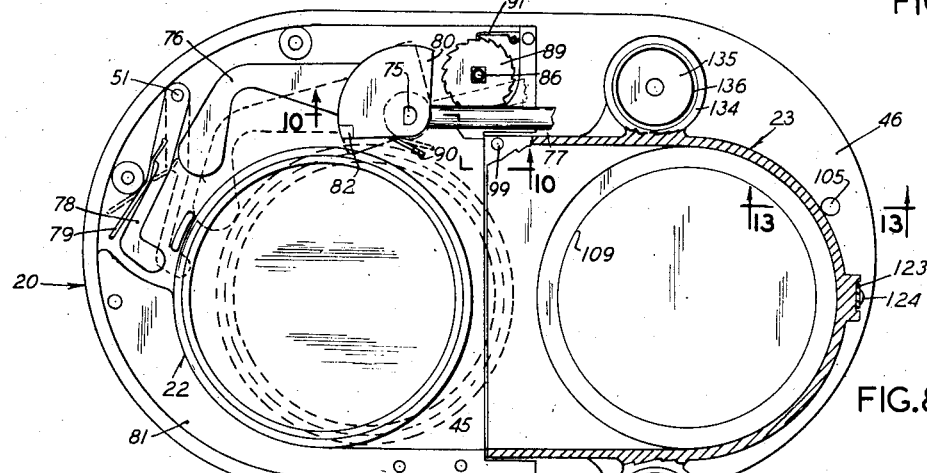
Fig. 8 is a top plan view of the dispenser and cassette with a part of the dispenser removed to show details of the mechanism for ejecting film elements from the dispenser and into the cassette, the latter being shown in horizontal section.
Figure 9:
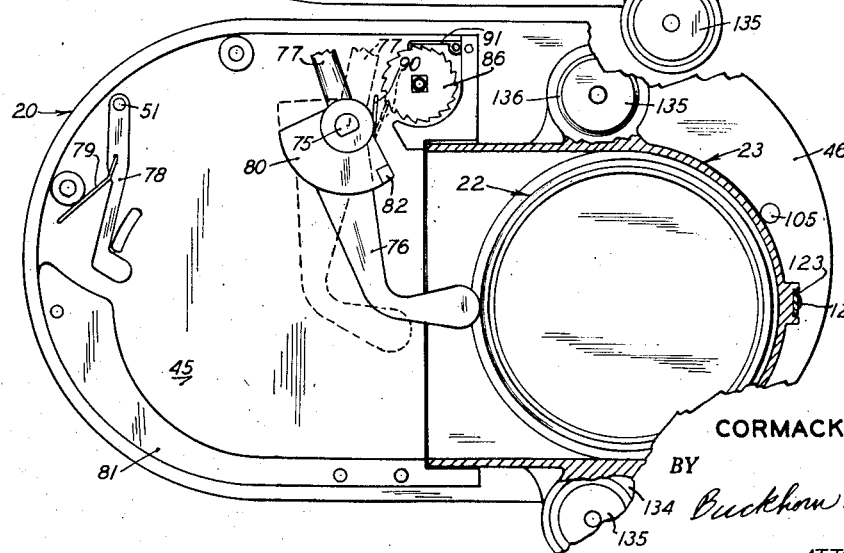
Fig. 9 is a view similar to Fig. 8 showing further details of the operation of the dispenser.

With particular reference to Figs. 7, 8 and 9, the film dispenser 20 includes an elongate base 44 including a flat table portion 46 for supporting the cassette 23 during loading of the same, and a further flat table portion 45 upon which the film units 22 are stacked and moved from the canister 21 to the cassette 23. The base is conveniently made of molded plastic material and ribs 47 may be provided below the table portions 45, 46 which with a depending peripheral skirt 48 strengthen the base and also raise the table portions so that various mechanisms to be described may be mounted therebeneath.

Mounted on the base 44 above the table portion 45 is a housing portion 50 secured to the base 44 by suitable means such as bolts 51. The table portion 45 defines a ledge around its periphery and the housing 50 is provided with a flange adapted to engage the ledge, as indicated at 52 in Fig. 7, to form a light tight seal between the housing and base. The housing portion 50 is also conveniently formed of a molded plastic and includes a portion which provides a cylindrical compartment or magazine 53 into which the canister may be inserted. To more clearly show details of the dispenser, it is shown in Figs. 8 and 9 with the housing portion 50 removed from the base 44. As shown in Fig. 7, the inner wall of the magazine 53 is provided with means such as a ledge 54 spaced above the surface of the table portion 46 for engaging and supporting the canister in spaced relation above the base.

The top part of the magazine 53 is provided with threads which cooperatively mate with the threads of an inverted cup shaped cover 57, which also may be of molded plastic. The lower threaded part of the cover is stepped outwardly from the upper part thereof defining a seating surface 59 which engages the top edge of the magazine 53 when the cover is screwed down tightly to form a light trap for any light which may filter upwardly through the threads. The cover 57 is formed with a centrally located, downwardly depending projection 58 which is adapted to extend within the top of the canister 21 when the cover is screwed down as shown in Fig. 7. Thus, as the cover 57 is tightened on the magazine 53, the projection 58 will engage the upper canister cover 38, forcing it downwardly relative to the canister body 34. The pressure on the upper cover 38 will be transmitted through the film units 22 to the lower canister cover 37 causing the same to be expelled from the canister and to drop upon the table portion 45 followed by the film units 22, whereafter the cover 37 and film units may be ejected from the magazine through an opening 65 immediately above the table portion 45.

Referring for a moment to Fig. 2, the cassette 23 includes an elongate muzzle or snout 60 defining an aperture or slot 61 through which the film units 22 may be loaded into or removed from the cassette. The snout 60 is formed as an integral portion of a base part of the cassette which, in the embodiment shown, has a flat bottom surface for supporting the cassette upon the table portion 46 as shown in Fig. 7. The housing portion 50 is formed so as to provide with the base 44 an enclosure or mouth 64 communicating with the opening 65 and adapted to receive the snout 60 and encompass the same relatively closely so as to preclude the transmission of light to a film unit during its transfer from the magazine 53 to the cassette. As shown in Fig. 7, the table portion 46 upon which the cassette 23 is mounted is stepped downwardly below the level of the table portion 45 by an amount such that the lower surface of the cassette slot 61 is substantially on the same plane as the table portion 45, thus to facilitate sliding of a film unit 22 along the surface 45 and into the cassette.

Figure 14:
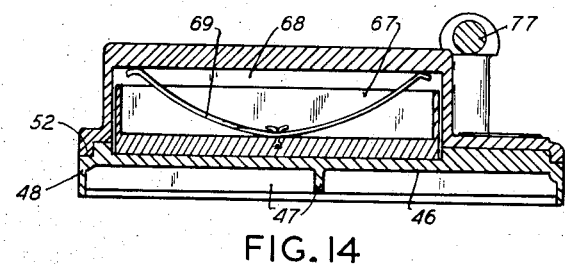
Fig. 14 is a sectional view taken along line 14—14 of Fig. 1 showing details of the shutter or light gate mechanism.

To prevent the transmission of light into the film magazine 53 through the opening 65 when the cassette is removed from the mouth 64, a light gate or shutter 67 is provided. The shutter 67 is mounted within a recess 68 formed in the housing portion 50 above the mount, and is urged by means of a spring 69 to a downward, closed position across the opening 65, as shown in Fig. 14. Referring now to Fig. 7, the shutter is provided with a beveled face 70 on the side thereof facing the open end of the mouth 64 and disposed at an oblique angle relative to the direction of movement of the cassette as the snout is inserted in the mouth 64, whereby the engagement of the snout with the face 70 will cam the shutter upwardly into the recess 68 and above the opening 65. As the cassette is withdrawn from the mouth 64 after loading, the spring 69 will automatically bias the shutter downwardly and across the opening 65 as shown in Fig. 14 to close the same and preclude transmission of any light into the magazine 53. The side of the shutter facing the magazine compartment is flat and disposed at right angles to the plane of the table surface 45 and to the direction of movement of film units 22 as they are ejected from the magazine by means to be described whereby, if the shutter is lowered, it cannot be forced open by the attempted ejection of a film unit from the magazine.

Means are provided for ejecting or moving the bottom film unit 22 of a stack thereof within the magazine 53 into the cassette 23. Referring now more particularly to Figs. 8 and 9, extending upwardly through the base 44 and housing portion 50 is a shaft 75 to which is secured an arm 76 which is adapted to swing across the surface of the table portion 45 upon rotation of the shaft 75. A lever 77 is provided on the shaft 75 for actuating the same. The cocked or inactive positions of the arm 76 and lever 77 are shown in solid lines in Fig. 8. It will be noted that in the cocked position the free end of the arm 76 is to one side and to the rear of a film unit 22 relative to the cassette 23. Upon swinging the lever 77 counterclockwise, the arm is caused to move across the surface of the table 45, engaging as it moves the film unit 22 resting thereon to eject or propel the film unit through the opening 65, as indicated in dotted lines in Fig. 8, and into the cassette 23. The limit position of the swing of the lever 77 and arm 76 is shown in solid lines in Fig. 9, in which position the arm has pushed the film unit 22 into position within the cassette 23. To guide the film units 22 during the ejection thereof the base 44 is provided with a raised strip 81 on the table portion 45.

Means are provided in association with the ejection mechanism to engage the film unit 22 next above the lowermost unit of a stack to retain the same in elevated position during the ejection of the lowermost unit and during the return stroke of the arm 76. The illustrated means include a finger 78 pivotally journaled on one of the bolts 51 securing the housing portion 50 to the base 44. A spring 79 is arranged with the finger 78 to urge the same outwardly beneath the stack of film units 22 as shown in the dotted line position of the finger in Fig. 8 and in solid lines in Fig. 9. The arm 76, however, in its retracted position engages the finger 78 and forces it to a retracted position to one side of the stack of film units as shown in solid lines in Fig. 8. Additionally, a stack supporting finger or element is carried by the arm 76 and shaft 75 in the form of a plate 80 which pivots with the shaft 75 from a retracted position to one side of the stack of the film units, as shown in solid lines in Fig. 8, to a stack supporting position as the arm 76 is swung to engage the lower film unit of a stack, as shown in dotted lines in Fig. 8 and solid lines in Fig. 9. The leading corner of the plate 80 is beveled as at 82 so as to form an entering wedge and facilitate its movement beneath the stack.

Means are provided for indicating the number of film units that remain in the dispenser magazine at any given time, which means include a dial 85 (Figs. 1 and 10) fixed on the upper end of a shaft 86 extending vertically through the loader base 44 and the housing portion 50. The dial 85 is marked with numbers along its periphery corresponding to the number of film units which are contained within the canister 21, and a pointer 87 is formed on the housing 50 adjacent the periphery of the dial. A spring 88 (see Fig. 10) is arranged about the shaft below the base portion to urge the shaft downwardly relative to the base and secure it in posiition. The dial 85 is indexed stepwise by means of a wheel indexing finger 90 carried by the arm 76 and adapted to engage a toothed wheel 89 (Figs. 8 and 9) fixed to the shaft 86 and index the same by one step upon completion of the stroke by the arm 76 to transfer a film unit 22 into the cassette 23. A stop spring 91 is cooperatively arranged with the toothed wheel 89 to prevent free rotation of the dial 85.

Means are provided to indicate the partial or complete ejection of a film unit 22 from the magazine 53, which means in the illustrated embodiment comprise an arrangement to prevent return of the lever 77 to its cocked position after a film unit is partially or fully ejected, thus to indicate the status of the operation by the position of the lever. With particular reference to Figs. 10 to 12, inclusive, such means comprise a ratchet arrangement including a horizontally disposed ratchet plate 95 formed of spring steel or other resilient material fixedly secured to the lower end of the shaft 75 beneath the base 44 so that the ratchet plate rotates with the shaft. A coil spring 96 is connected between the ratchet plate 95 and one of the ribs 47 to bias the shaft to the position where the arm 76 and lever 77 are in their cocked position, that is, the position shown in solid lines in Figs. 8 and 11. The ratchet plate 95 is formed with two spaced apart pawl engaging notches 97, 98 adapted to be engaged by a pawl 99 which extends upwardly through the table portion 46 and within the mouth 64. The pawl 99 is adapted to move vertically and is normally biased upwardly to a position shown in solid lines in Fig. 10 above the ratchet plate 95 by a leaf spring 100 fixed at one end to the under side of the base by a screw 101 and arranged with its other end to press upwardly against a collar 102 formed on the pawl 99, which collar also engages the under side of the base 44 to limit the upward movement of the pawl. The end of the pawl protruding above the table portion 46 is conically tapered and is adapted to be engaged by the cassette 23, as the latter is moved into loading position, and to be depressed downwardly to the position shown in Fig. 12, in which depressed position the lower end of the pawl 99 is slightly below the plane of the ratchet plate 95 so as to deflect the plate when it is engaged by the pawl. The lower end of the pawl 99 is formed with an abrupt shoulder 103 which is adapted to engage an edge of the notches 97, 98 under certain conditions as will be described and which shoulder faces away from the direction of rotation of the ratchet plate during the movement of a film unit 22 into the cassette 23. The opposite side of the lower end of the pawl is tapered upwardly from the edge of the shoulder 103 to form a camming surface 104.

As the loading operation is started, the ratchet plate 95 will rotate under the depressed pawl 99 and after sufficient movement of the ejection mechanism to partially eject a film unit 22 from the magazine and to a position beneath the shutter 67 as shown in dotted lines in Fig. 8 has occurred, the notch 97 will be brought in position directly beneath the pawl 99 and the resiliency of the ratchet plate will cause it to spring upwardly to its normal flat position whereby one edge of the notch faces the pawl shoulder 103 as shown in Fig. 12. Thus, if the loading movement is stopped and the lever 77 released, the spring 96 will urge the ratchet plate 95 and remainder of the film unit ejection mechanism back toward the cocked position. Such movement will be immediately arrested, however, because of the engagement of the pawl shoulder 103 with the facing edge of the notch 97 so that the lever 77 will be held in an intermediate position such as shown in dotted lines in Fig. 8 to give a visual indication that a film unit 22 has been partially ejected from the magazine. If the loading movement is not stopped at this point but is continued, the pawl camming surface 104 will engage the opposite side of the notch 97 and cause the ratchet plate 95 to deflect downwardly and beneath the pawl so that the loading movement will not be arrested. Similarly the ratchet plate 95 will spring upwardly as the notch 98 comes into position beneath the pawl 99, but again the pawl cam surface 104 will deflect the ratchet plate downwardly as the loading movement is continued to permit completion of the loading movement, at which time the arm 76 and lever 77 are in the position shown in Fig. 9 in solid lines and the ratchet plate 95 is in the position shown in dotted lines in Fig. 11. If the lever 77 is then released, the spring 96 urges the mechanism back toward the cocked position whereupon the ratchet plate 95 will be rotated to bring the notch 98 into position beneath the pawl 99. When this occurs, the tendency of the ratchet plate 95 to return to its original, flat condition will cause it to spring upwardly to bring the pawl shoulder 103 into engagement with the edge of the notch 98, arresting the movement of the ratchet plate and the remainder of the loading mechanism in the position shown in dotted lines in Fig. 9. The notch 98 is positioned so that the arm 76 is retracted from beneath the shutter 67 before the arm is arrested as shown in Fig. 7. It will be seen in Fig. 9 that the lever 77 will be held in a position far removed from its cocked position to give a visual indication that the cassette is loaded, and the arresting of the lever before it returns to its cocked position prevents any inadvertent attempt to load a second film unit into the cassette.

After the cassette 23 is loaded, it may be removed from the loader 20, freeing the pawl 99 for its return to its normal, upward position to which it is biased by the spring 100. Preferably, the relative strength of the springs 96, 100 is such that the frictional engagement of the ratchet plate 95 with the pawl shoulder 103 is sufficient to prevent the pawl from disengaging until it is intentionally manually released. The pawl 99 may be released by simply moving the lever 77 a slight amount in the loading direction whereupon the notch edge will be removed from the proximity of the pawl shoulder, freeing the pawl for upward movement under the urging of the spring 100, whereafter the ejecting mechanism may return under the urging of the spring 96 to the cocked position of the mechanism.

To retain the cassette 23 in loading position upon the dispenser 20, a simple latch is provided comprising a button 105 mounted in the table portion 46 at the end thereof opposite the mouth 64 and in a position to engage the cassette and prevent the retraction of the snout 60 thereof from within the mouth. As shown in Fig. 13, the button 105 is slidably mounted in an opening in the table portion 46 and is urged above the table by a leaf spring 106 suitably mounted beneath the table and engaging the button. The button 105 is automatically depressed by the cassette when it is placed on the table portion 46 prior to sliding the snout 60 into the mouth 64. When the cassette is moved to loading position, the button 105 is freed and snaps up adjacent the rear edge of the cassette, preventing its accidental withdrawal. To remove the cassette 23, the button is depressed manually and the cassette then withdrawn over the depressed button.

Cassette

Figure 15:
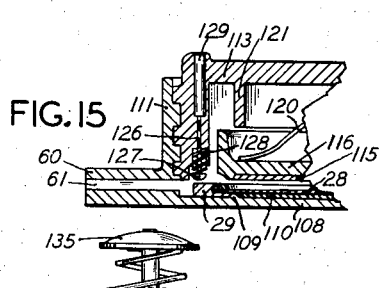
Fig. 15 is a fragmentary, sectional view of the cassette showing details of its construction and of the means for indicating that the cassette is loaded.
Figure 16:
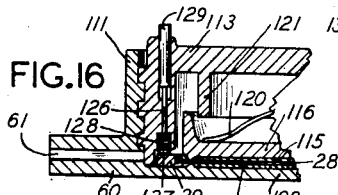
Fig. 16 is a further sectional view similar to Fig. 15, showing a further sequence in the operation of the detail of Fig. 15.

The cassette 23 includes a body portion molded of X-ray transparent plastic, of which body portion the snout 60 forms an integral part and which is also formed with a flat bottom wall 108 upon which the film unit 22 rests during an exposure. As best shown in Figs. 15, 16, the cassette bottom wall 108 is recessed a slight distance below the snout aperture 61 for reasons to be explained, and is provided with an upwardly projecting circular ridge 109 having the diameter of the inner periphery of the film unit frame, and about which ridge 109 the frame is positioned in the cassette. Preferably, an X-ray intensifying screen indicated at 110 is secured to the bottom wall within the ridge 109. The cassette body portion includes an internally threaded tubular side wall portion 111 which extends upwardly from the bottom wall 108 for receiving a molded plastic cover including an inverted cup shaped portion 113 which is threaded cooperatively to engage the threads of the side wall 111. The cover portion 113 may be provided with upstanding wings 114 to assist in rotating the cover to raise or lower it relative to the body portion of the cassette. The cover portion 113 carries a second intensifying screen 115 which is secured to the underside of a cup shaped circular carrier portion 116 and is of a diameter substantially equal to the inner diameter of the film unit ring 30. The carrier portion 116 is recessed upwardly around its peripheral edge to admit the film unit frame as best shown in Fig. 16 so that the intensifying screen 115 may be pressed flat against the upper surface of the film 28, also as shown in Fig. 16. The carrier 116 is movably supported from the cover portion 113 by a screw or bolt 118 (Fig. 7) extending downwardly through an opening in the cover portion 113 and engaging in a boss 119 formed on the upper surface of the carrier, and a pair of leaf springs 120 are cooperatively arranged between the cover portion 113 and the carrier 116 normally to bias the carrier downwardly relative to the cover portion. The cover portion 113 is formed with a circular, downwardly depending flange 121 that extends downwardly into the recessed top of the screen carrier 116 so that the sides of the carrier and the flange overlap and prevent any transmission of light from the opening for the screw 118 to the side of the cover from which it might be reflected onto a film.

When the cassette is to be loaded, the cover is rotated to raise the lower edge of the cover portion 113 above the slot or aperture 61 as shown in Fig. 15. The screen carrier 116 is mounted on the cover 113 so that it also will be raised to permit the passage of a film unit 22 therebeneath and into position about the ridge 109. To prevent inadvertent raising of the cover 113 by too great an amount, a stop means is provided comprising the inverted L-shaped strap 123 (Fig. 7) which is secured to the body portion by any suitable means such as a screw 124 and which includes a toe extending over the cover to engage the same before it is completely threaded outwardly from the cassette body portion. After the cassette 23 is loaded with a film unit 22, the cover is threaded downwardly to a fully closed position in which the bottom edge of the cover portion 113 is in snug engagement with the bottom wall 108 completely about the ring 29, and which position is indicated in Fig. 16. Since the bottom wall 108 is recessed below the bottom of the aperture 61, the lowering of the cover to overlapping engagement with the ledge between the bottom wall 108 and the aperture 61 will form a light tight closure and prevent accidental and unwanted exposure of the photographic film to light. The screen carrier 116 is suspended from the cover portion 113 in such fashion that the intensifying screen 115 will contact the upper surface of the film 28 of film unit 22 slightly before the time that the cover portion is fully lowered so that the springs 120 yieldingly urge the intensifying screen 115 into contact with the upper surface of the film 28.

Means are provided for indicating the presence of a film unit 22 within the cassette. Referring now more particularly to Figs. 15 and 16, the cover portion 113 is provided with a small vertical opening directly above the position of the film unit frame, in which opening an indicating pin is mounted for vertical reciprocaton, the pin comprising a lower portion 126 having a head 127 on its lower end. A small coil spring 128 is arranged between the cover portion 113 and the pin head 127 to bias the pin downwardly relative to the cover portion. The pin opening is counterbored from the top of the cover portion 113 for receiving an indicating button 129 in the form of a tube having a lower end pressed onto the lower pin portion 126 and a closed upper end. The button 129 is adapted to engage the bottom of the counterbore recess to limit the downward movement of the indicating pin and the button 129 is of the same length as the counterbore so that it is completely received therewithin when the indicating pin is biased downwardly by the spring 128 as shown in Fig. 15. The pin is adapted to engage the frame 29 of a film unit when the cassette cover is screwed down to closed position and to be forced upwardly so as to raise the button 129 above the upper surface of the cover portion 113 as shown in Fig. 16, thus to give a visual indication of the presence of a film unit within the cassette. If no film unit 22 is within the cassette, the pin will not be forced up, thus to indicate the absence of a film unit.

Figure 17:
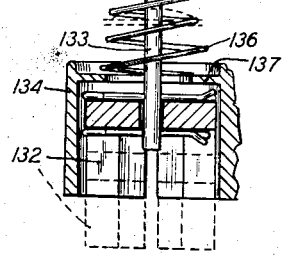
Fig. 17 is a sectional view showing the arrangement of magnetic leeches upon the cassette.

To facilitate the mounting of a cassette on structures of magnetic material, magnetic leech means are provided on the cassette comprising a pair of permanent magnets 132 mounted one on each of the opposite sides of the cassette. With reference to Fig. 17, each magnet is mounted on the end of a short rod 133 which extends through a corresponding open ended tubular ear 134 formed on the body portion of the cassette. The end of the rod opposite the magnet is provided with a head 135, and a coil spring 136 is arranged between such head and a flange 137 provided on the inner periphery of the ear 134. The magnets 132 are normally urged to a position within the ears as shown in solid lines in Fig. 16, but may be moved outwardly of the ears and laterally against the urging of the springs 136 as indicated in dotted lines in Fig. 16.

Developing device

Figure 19:
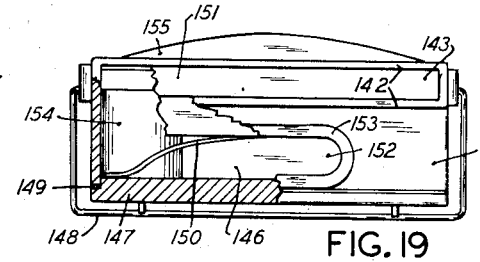
Fig. 19 is a top view of the developing unit partly broken away.
Figure 18:
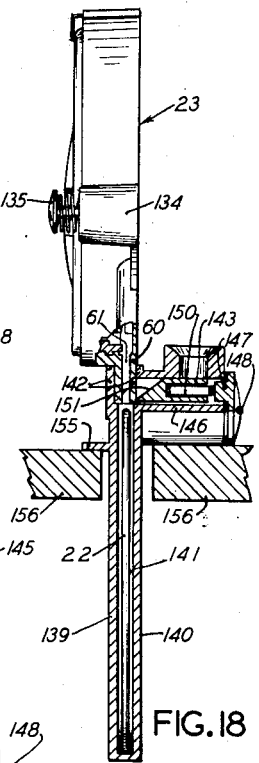
Fig. 18 is a view of the cassette, partially in section, arranged upon the developing unit, shown in longitudinal section, for transferring an exposed film element to the latter.
Figure 20:
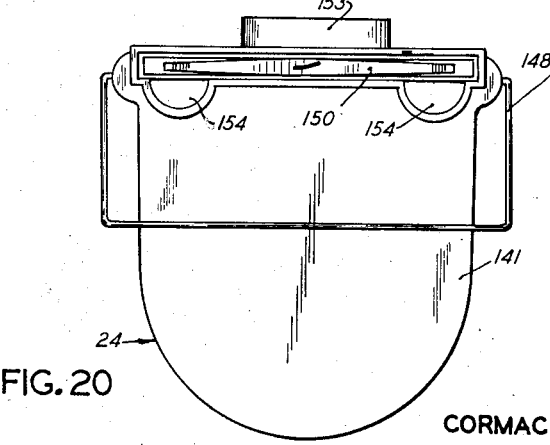
Fig. 20 is a side view of the top portion of the developing unit with the cover thereof removed.

The film developing unit or device 24 which will now be described is adapted to receive a film unit after its exposure in the cassette 23 for development thereof. With particular reference now to Figs. 18, 19 and 20, the developing device comprises a molded plastic body including a pair or parallel flat wall portions 139, 140 (Fig. 18) which are slightly spaced apart and joined along their side and lower marginal edges to form a developing tank 141 in which a film unit 22 is held during developing of the same. Extending upwardly from the open top of the tank 141 are lips 142 which define a mouth for encompassing the snout 60 of the cassette 23 as shown in Fig. 18. A light gate or shutter 143 is provided for closing the top opening of the tank 141 during the developing process. The shutter is mounted for sliding movement in a rectangular housing formed on the side wall 140 and including a substantially flat top wall 145 and a bottom wall 146 which are spaced to define a guiding slot for receiving the shutter 143 when it is moved to one side of the tank opening. The shutter housing is provided with a removable cover 147 held in position by a snap closure lever 148, a gasket 149 being interposed between the cover and the housing to provide liquid tight closure. The shutter 143 is yieldingly urged to a position closing the tank opening by means of a spring 150 carried by the shutter and engaging against the housing cover 147 as shown most clearly in Fig. 19. Preferably, the shutter 143 is of construction identical to that of the dispenser shutter 67 so that the shutters may be used interchangeably in either the dispenser or the developing device. Thus, similar to the shutter 67, the shutter 143 is provided with a slanting face 151 which is adapted to be engaged by the cassette snout as the cassette is arranged in position over the developing tank as shown in Fig. 18, to urge the shutter to open position against the bias of the spring 150. In Fig. 18 the closed position of the shutter 143 is indicated in dotted lines.

Means are provided for passing developing liquids into and out of the tank 141 comprising an opening 152 in the top housing wall 145 which is spaced outwardly from the upper edge of the developing tank opening out of direct line relation therewith whereby any light passing through the opening 152 will not be transmitted directly into the tank. The housing is preferably provided with a funnel-like rim 153 extending upwardly from the top wall 145 about the opening 152. The bottom housing wall 146 is provided with a depression or channel 154 at each of its opposite sides which communicate with the developing tank 141 below the shutter 143 whereby any liquid poured in through the opening 152 may flow into the tank 141 through the channels and, conversely, liquid may be discharged through the channels and opening 152 by inverting the tank.

To facilitate mounting of the developing device on a scaffolding or swing stage from which X-ray operations are frequently made during examinations of chemical processing equipment or the like, a flange 155 may be formed on the tank wall 139 opposite the housing 144 so that the device may be supported by the housing and the flange between the planks 156 of a scaffold or staging as shown in Fig. 18.

Description of operation of apparatus

The operation of the apparatus of the invention is as follows. A loaded canister 21 is placed in the magazine 53 of the dispenser 20, and the cover 57 screwed down tight about the cansiter causing the bottom cover 37 of the canister to be ejected and fall upon the table 45 of the loader as previously described and the film units 22 to fall in a stack upon the cover 37. The cassette 23 is then moved into loading position on the dispenser which will cause the shutter 67 to be raised above the aperture 65 and the pawl 99 depressed and conditioned for engaging the ratchet plate 95. The cover 113 of the cassette is then unthreaded to raise the same so that a passage way is provided from the magazine of the dispenser into the cassette. The lever 77 may then be manipulated to move the cansiter cover 37 into the cassette, after which the cassette is removed from the dispenser and turned with snout 60 down so that the cover will fall out of the cassette. As the lever 77 is manipulated to eject the cover 37, the finger 78 and the plate 80 will move beneath the film unit 22 which is immediately above the cover 37 to support the stack of film units in elevated position above the table portion 45. The lever 77 will remain in loaded position as shown in dotted lines in Fig. 9, of course, after the cassette is removed to prevent any light from being transmitted into the magazine 53. Before the cassette is moved back into loading position, the lever 77 is manipulated to disengage the ratchet mechanism and permit recocking of the film unit ejecting mechanism, as described hereinbefore. After the ejecting mechanism has returned to cocked position, the cassette 23 is remounted in loading position and the lever 77 again actuated, this time to move into the cassette the lowermost film unit 22 of the stack thereof. Before loading the first film unit into the cassette, the indicating disc 85 is manually zeroed. After the film unit 22 is moved into position in the cassette, the lever 77 is released whereupon it returns to the intermediate position shown in dotted lines in Fig. 9 to indicate to the operator that the cassette has been loaded. The operator then screws down the cover 113 of the cassette 23 so as to close the snout opening 61 thereof. In screwing down the cover the indicating button 129 of the cassette is raised, giving a further indication that the cassette is loaded. The cassette is then removed from the dispenser 20, whereupon the shutter 67 will drop to close the opening 65 and whereafter the lever 77 may be recocked to condition the ejection mechanism for loading another cassette.

After the cassette 23 is removed from the dispenser 20, it may be positioned on the work to be X-rayed. If the examination is being made on a structure made of magnetic material, the magnets 132 may be utilized to hold the cassette in position. The movable arrangement of the magnets facilitates the attachment of the cassette on work having an irregular surface.

After the exposure has been completed, the cassette is arranged over the film developing unit 24, as shown in Fig. 18, automatically opening the shutter 143. The cassette cover 113 is then unscrewed so that the exposed film unit 22 may drop from the cassette into the developing tank 141. The cassette is then disengaged from the tank whereupon the shutter 143 snaps back into position across the tank opening. Thereafter the various developing solutions may be poured into the developing tank through the opening 152 and be removed from the tank by inverting the same. When the developing process is completed, the cover 147 is removed to permit the shutter 143 to be moved to one side of the tank opening, and the tank is inverted so that the developed film unit will drop out.

The advantages of the apparatus of the invention are readily apparent. It will be observed that the various units thereof are compact and thus may be easily transported to the very place where the X-ray examination is being made, and may be easily and readily used at that location. Moreover, the operator of the X-ray equipment can immediately develop an exposed film to determine whether or not the exposure he has made is satisfactory or whether a further exposure should be made. The rings or frames 29 may be reused, though their simplicity and low manufacturing cost may make it feasible simply to discard them after they are used. The canister 21 is a convenient and inexpensive shipping container for the film and makes possible recharging of the dispenser expeditiously without requiring a darkroom and without exposing the film discs 28.

Having illustrated and described a preferred embodiment of the invention, it should be apparent to those skilled in the art that the invention permits of modification in arrangement and detail. I claim as my invention all such modifications as come within the true spirit and scope of the appended claims:

1. Portable light weight apparatus for use in making X-ray examinations comprising in combination, a cassette having a compartment for holding a film element during the X-ray exposure, a film dispenser comprising means defining a magazine, a stock of sensitized film elements in said magazine, said film elements each comprising an X-ray sensitive film member and a relatively stiff supporting ring encompassing said film member and extending outwardly on each of the opposite sides of the plane of said film member whereby said film member is supported by said ring in spaced relation from a supporting surface, means for ejecting said film elements one at a time from said magazine for loading into said cassette, a film developing unit having a light tight tank into which an exposed film unit may be placed for developing the same, and means on said cassette and said dispenser and developing unit for releasably mounting said cassette in light tight relation on said dispenser to receive a film element from the magazine of the dispenser and in light tight relation on said developing unit for transferring the exposed film element to the said tank of said developing unit.

2. In combination, X-ray exposure apparatus comprising a cassette for holding a film element for exposure of the same, a film loading device having means for retaining a film element in readiness for loading into said cassette, and interchangeable means on said cassette and said loading device for releasably mounting said cassette on said loading device and providing a light tight passage way for transfer of said film element into said cassette, and transfer means in said loading device operable to move a film element from said loading device into said cassette, said transfer means including a manually operable actuating lever movable from a cocked position to a second position remote from said cocked position to effect transfer of said film element, said cassette being separable from said loading device to permit exposure of a film element therein at a position remote from said loading device.

3. A frame for supporting a circular photographic film comprising a base ring of an axial thickness several times that of said film, the inner periphery of said base ring being stepped to define a flat surface parallel to the transverse median plane of said base ring, said base ring having a recess adjacent said flat surface defined by a first wall portion coplanar with said flat surface and a second wall portion parallel to said flat surface and spaced therefrom by a distance substantially greater than the thickness of said film, and a lock ring including a nose portion adapted to engage in said recess and having opposed sides parallel to said wall portions and spaced apart by a distance equal to the distance between said wall portions less the thickness of said film whereby a circular film may be placed upon said base ring flat surface and said lock ring nose portion inserted into said recess to hold said film in said frame in substantial coplanar relation with the said median plane thereof.

4. A relatively rigid frame for supporting a flat, relatively flexible photographic film of given outline to facilitate movement of the film from place to place and to protect said film during such movement, said frame being formed to encompass the edge of said film and having opposite parallel side surface portions for engaging a flat supporting surface, said surface portions being spaced apart a distance substantially greater than the thickness of said photographic film, and means on the inner periphery of said frame for engaging the opposite sides of said photographic film along the marginal edge portion of said film for supporting the same substantially midway between the planes of said surface portions whereby said film will be sustained out of contact with said supporting surface with either of said surface portions in engagement therewith.

5. In combination, a circular photographic film and a supporting element therefor comprising a relatively stiff circular frame encompassing said film and extending outwardly on each of the opposite sides of the plane of said film, and means on said frame releasably engaging the opposite sides of said film for releasably retaining said film within said frame whereby said film is held by said frame in spaced relation from any flat surface upon which said ring may be disposed.

6. An article of commerce comprising a base ring having a circular body portion of substantial thickness in the axial direction and a circular flange portion extending radially inwardly from said body portion, said flange portion having a surface substantially coplanar with the transverse plane bisecting said body portion, said body portion having a circular recess on the inner periphery thereof on the side of said transverse plane opposite said flange portion, a lock ring disposed within said base ring, said lock ring having a flat surface opposing said flange portion and a nose portion projecting into said recess, and a circular sensitized photographic film disposed between said rings with the marginal edge portions of said film engaged between said surfaces whereby said rings will support said film in spaced relation from any flat surface upon which the article may be placed.

7. In a film loading apparatus of the class described, a planar base upon which a film element may be moved in transferring the film element from a supply of the same contained within a tubular canister to a cassette, a tubular canister support extending upwardly from said base for receiving said canister and having a ledge therein spaced above said base for engaging and supporting said canister above said base whereby said film elements may drop from said canister upon said base and be moved therealong towards said cassette.

8. In apparatus for transferring film elements from a magazine of the same to an exposure cassette, the combination comprising a film canister including an open ended tubular body, a stack of film elements in said body, a cover on one end of said body frictionally engaging the same and expellable by pressure transmitted through said stack of film elements, a closure disc within said body at the opposite end of said body and slidable axially of said body, a film element transferring device comprising a base having a film element transferring surface, means defining a socket for receiving said canister and supporting said body in spaced relation above said surface with said one end down, a cover member for said socket means to provide a light tight chamber for said canister, and means on said cover member for engaging said disc as said cover member is mounted on said socket means to depress the disc and said film element stack downwardly relative to said body thus to expel said canister cover from said body and upon said surface.

9. A film loading device comprising a base having a flat upper surface along which a film element may be moved from a supply of the same, means extending above said base defining a compartment for retaining a supply stack of said film elements and having an aperture adjacent said surface through which a film element may pass, an arm pivotally mounted on said base for swinging movement across said surface and adapted to engage the lowermost element of a stack and to move the same along said surface, an operating lever connected to said arm for effecting said movement thereof, and finger means separate from said arm and operatively associated with said lever for movement, upon film ejecting movement of the arm, beneath the film element next above said lowermost film element to retain the same in elevated position, thus providing clearance for the return movement of said arm, said finger means being retractable from beneath the film element supported thereby upon return of said lever to its original position.

10. In combination, a cassette and a device for loading a film element into said cassette including compartment means for retaining a film element in readiness for loading into said cassette, interengageable means on said device and said cassette for releasably mounting said cassette on said device and providing a light tight passage way for transfer of said film element into said cassette, transfer means in said device for moving said film element along said passage way from said device and into said cassette, said transfer means including a manually operated actuating lever movable from a cocked position to a second position remote from said cocked position to effect transfer of said film element, and ratchet means conditioned by the mounting of said cassette in loading position upon said device and operative to engage said transfer means upon partial transfer of a film element into said cassette and to prevent return of said actuating lever to cocked position whereby the position of said lever will provide an indication of the partial transfer of said film element.

11. In combination, a cassette and apparatus for loading a relatively flat film element from a supply of the same into said cassette comprising means defining a chamber for retaning a supply stack of film elements and having an opening therein through which a film element may be ejected, said cassette having a slot in a side thereof for receiving one of said film elements, cooperative means on said cassette and apparatus for mounting said cassette in film element receiving position adjacent said opening, film element transfer means for moving a film element from said stack through said opening and into said cassette slot including a manually operable lever movable from a first position to a second position during transfer of a film element, and stop means conditioned by the mounting of said cassette in film element receiving position for engaging said transfer means upon partial or full ejection of a film element from said chamber and preventing return thereof to said first position until said cassette is removed from said film element receiving position thus to give a visual indication of the status of the loading operation.

12. In combination, a self contained cassette and apparatus for loading a flat film element into said cassette, said loading apparatus comprising means defining a chamber for retaining a supply stack of film elements and having an opening adjacent one end of the stack through which the end film element of said stack may be ejected, manually operable means for ejecting said end film element through said opening, said cassette being separable from said loading apparatus and including a snout defining a film element receiving slot adapted to be positioned in register with said opening, means on said loading apparatus adapted cooperatively to engage and overlap said snout when said cassette is in film loading position and to provide a light tight shield so as to preclude the transmission of light to said film element during the loading operation, and a light gate member slidably mounted on said loading apparatus to overlie said opening when said cassette snout is removed from said apparatus and arranged for movement to one side opening upon movement of said cassette into loading position.

13. An X-ray cassette for holding a film element during exposure of the same and comprising a hollow base portion having a bottom wall and a tubular side wall, a snout extending outwardly of said side wall and defining a passage way communicating with the interior of said base and through which passage way said film element may pass, a cup shaped cover member including a tubular side wall portion received cooperatively within said body side wall, cooperative means on said base and cover member side walls for effecting raising and lowering of said cover member relative to said base whereby said cover member may be lowered in overlapping relation with said slot passage way and define with said bottom wall a light tight compartment for said film element and may be raised to expose said passage way for entrance or discharge of a film element from the cassette.

14. An X-ray cassette for receiving a photographic film element including a circular film supporting frame, said cassette comprising a body portion having a flat bottom wall upon which said frame is adapted to be positioned, an internally threaded side wall portion extending upwardly from said bottom wall having an inner diameter slightly greater than the outer diameter of said frame, said side wall portion having an aperture therein through which a film element may be inserted or removed from the cassette, and a cover member including an outer wall portion threaded cooperatively to engage the threads of said side wall portion whereby said cover member may be raised or lowered relative to said bottom wall, said cover member being adapted to encompass said film element frame when lowered and to engage snugly said bottom wall thus to provide a light tight chamber for the film element.

15. An X-ray cassette for receiving a sensitized film element, said cassette comprising a body portion having a flat bottom wall upon which said film element is positioned for an X-ray exposure and a tubular side wall extending upwardly from said bottom wall, said side wall having an opening therein spaced above said bottom wall through which said film element may be introduced to and removed from said cassette, a cup shaped cover member including a tubular side wall portion received cooperatively within said body side wall in slidable engagement therewith and having a lower edge adapted to engage said body portion bottom wall about said film element to define a light tight compartment for said film element, said cover member adapted to be raised above said opening to load or remove said film element and to be lowered after loading in overlapping relation to said opening to prevent transmission of light through said opening to said film element, and cooperative interengaging means on said body portion and cover member side walls for preventing transmission of light downwardly therebetween.

16. An X-ray cassette for receiving a photographic element including a circular film supporting frame, said cassette comprising a body portion having a flat bottom wall formed with an upstanding circular ridge thereon having the diameter of the inner periphery of said frame and about which ridge said frame is adapted to be positioned, a first X-ray intensifying screen mounted on said bottom wall within said ridge, an internally threaded tubular side wall portion extending upwardly from said bottom wall having an inner diameter slightly greater than the outer diameter of said frame, said side wall portion having an aperture therein spaced a slight distance above said bottom wall through which a photographic element may be inserted or removed from the cassette, and means defining a snout extending from said side wall portion and having a slot communicating with said aperture and through which slot said photographic element may pass, a cover member including an outer wall portion threaded cooperatively to engage the threads of said side wall portion, said cover member being adapted to encompass said frame and to engage snugly said bottom wall thus to provide a light tight chamber, a second X-ray intensifying screen carried by said cover member for engaging the upper surface of said film, resilient means yieldingly mounting said second X-ray intensifying screen upon said cover member whereby said intensifying screen is held in pressurable engagement with said film, and indicator means on said cover member actuated by engagement with a said frame to indicate the presence of a photographic element in said cassette.

17. In combination, a cassette having a film element loading snout, and a film eeveloping unit for processing a film element after exposure in said cassette, said film developing unit comprising wall means defining an open top liquid tight chamber for receiving said film element, lip means extending upwardly from said wall means defining a mouth for encompassing said loading snout of said exposure cassette whereby to form a light tight union therebetween, a light gate mounted for sliding movement across the top of said chamber, means resiliently biasing said gate to close said top, said gate having a beveled surface adapted to be engaged by said snout upon insertion thereof in said mouth to cam said gate to open position whereby a film element in said cassette may be transferred to said chamber.

18. A film developing apparatus for processing a flat photographic film element, comprising wall means defining an open top liquid tight chamber for receiving said film element, lip means extending upwardly from said wall means defining a mouth for encompassing the film element loading snout of an exposure cassette whereby to form a light tight union therebetween, a light gate mounted for sliding movement across the top of said chamber, means resiliently biasing said gate to close said top, said gate having a beveled surface adapted to be engaged by said snout upon insertion thereof in said mouth to cam said gate to open position whereby a film element in said cassette may be transferred to said chamber, and means defining a tortuous light tight liquid passage to said chamber for introducing to and removing developing liquids from said chamber.

19. A film developing device comprising a pair of generally spaced apart flat side walls joined along their side and lower marginal edges to define a liquid tight tank having an elongate, relatively narrow top opening for receiving a film element for developing thereof, a shutter for releasably closing said opening, a housing extending outwardly from one of said side walls and slidably receiving said shutter, said housing having a top and a bottom wall, an aperture in said top wall spaced outwardly from the top opening out of direct line relation therewith whereby light from said aperture will not be transmitted into said tank, said bottom wall defining at least one channel communicating with said tank beneath said shutter whereby developing liquid may pass from said aperture to said tank.

20. A film developing unit for processing a film element comprising a pair of opposite, parallel flat walls joined along their marginal edge portions to form a liquid tight film element receiving tank having a top opening, said walls being spaced relatively closely together, said walls each having a lateral projection thereon adjacent the top of said unit and opposite one another for supporting said unit between closely spaced scaffolding planks or similar structure.

References Cited in the file of this patent

UNITED STATES PATENTS

| | | |
|---|---|---|
| 604,455 | Brownell | May 24, 1898 |
| 1,086,555 | Pifer | Feb. 10, 1914 |
| 1,246,566 | Doering et al. | Nov. 13, 1917 |
| 1,393,108 | Garrett | Oct. 11, 1921 |
| 1,507,727 | Buck | Sept. 9, 1924 |
| 1,766,297 | Macke | June 24, 1930 |
| 2,027,642 | Hewitt et al. | Jan. 14, 1936 |
| 2,239,196 | Lunvik | Apr. 22, 1941 |
| 2,286,010 | Rabkin | June 9, 1942 |
| 2,297,847 | Wilckens et al. | Oct. 6, 1942 |
| 2,312,502 | Testi | Mar. 2, 1943 |
| 2,344,710 | McMurtry | Mar. 21, 1944 |
| 2,351,877 | Rabkin | June 20, 1944 |
| 2,353,769 | Stiffler | July 18, 1944 |
| 2,371,843 | Powers | Mar. 20, 1945 |
| 2,476,767 | Rabkin | July 19, 1949 |
| 2,617,944 | Sanchez-Perez | Nov. 11, 1952 |
| 2,629,303 | Grant | Feb. 24, 1953 |
| 2,679,009 | Lusebrink | May 18, 1954 |

FOREIGN PATENTS

| | | |
|---|---|---|
| 502,014 | Great Britain | Mar. 7, 1939 |